United States Patent Office 3,498,972
Patented Mar. 3, 1970

3,498,972
PROCESS OF MANUFACTURING
DEXTRAN SULFATE
Kinzo Nagasawa, 20, 2-chome, Kohinata-daimachi,
Bunkyo-ku, Tokyo, Japan
No Drawing. Filed Feb. 23, 1967, Ser. No. 617,839
Claims priority, application Japan, Mar. 1, 1966,
41/12,505
Int. Cl. C07c 139/10, 139/00
U.S. Cl. 260—234                         6 Claims

ABSTRACT OF THE DISCLOSURE

Depolymerization and sulfation of dextran by sulfuric acid. Dextran is dissolved at a temperature of from −30° C. to +50° C. in a concentrated sulfuric acid having a concentration of at least 85% by weight. The temperature is kept until the desired product is formed. A sufficient amount of an aliphatic ether such as diethyl ether or tetrahydrofuran is then added to the reaction mixture to precipitate the product, which is dextran monosulfate, disulfate, or trisulfate having homogeneous characteristic concerning molecular weight and sulfate group distribution.

This invention relates to the process of manufacturing dextran sulfate.

It is known that when dextran sulfate obtained by chemically treating a polysaccharide "dextran" produced from sucrose by a biological process has a proper molecular weight and a proper sulfur content, it has various physiological activities, especially a heparinoid blood anticoagulant activity and a lipemia clearing activity.

Researches concerning sulfation of dextran have been reported in C. R. Ricketts: Biochem. J. 51, 120–133 (1952) and Swedish patent specification 165,090. The former is a report concerning heparinoid actvities and toxities of various dextran sulfates having various sulfur contents, wherein as sulfating agents of dextran, chlorosulfonic acid and pyridine are used. In the latter is reported a process for the production of dextran sulfate which comprises dispersing dextran in formamide or acetamide, sulfating by chlorosulfonic acid or sulfur trioxide dissolved in pyridine.

It has been found that it is possible to simply produce dextran sulfate having more excellent physiological activities and a lower toxicity from dextran by a process which comprises dissolving dextran in a concentrated sulfuric acid having a concentration of at least 85% by weight at a temperature within the range of from −30° C. to +50° C., maintaining the obtained solution at a temperature within said range, and recovering from the reaction mixture the desired product in the form of a free ester or its salt.

The dextran used as the initial material is a polysaccharide composed from glucose units mainly linked at α-1,6 positions and it is produced by Leuconostoc mesanteroides from sucrose in a bacterial medium. This native dextran having a very high molecular weight (1,000,-000<) is partially hydrolyzed to prepare various kinds of depolymerized dextran of proper molecular weight.

In this specification and claims, both the native and the depolymerized dextran shall be referred to as "dextran."

A concentrated sulfuric acid used in the process of this invention reacts directly with dextran as a sulfating agent, at the same time, it acts as a solvent for the reactant and the reaction product. A concentrated sulfuric acid to be used must contain at least 85% by weight of $H_2SO_4$. The greater the water content, the lower becomes the sulfating efficiency and the depolymerization only occurs, therefore, use of a concentrated sulfuric acid containing at least 95% by weight is advantageous. With a sulfuric acid having a concentration of below about 75% by weight, the sulfation does not substantially occur, but depolymerization only occurs. A concentrated sulfuric acid used as a sulfating agent in the process of this application may also contain another sulfating agent such as $SO_3$ or $ClSO_3H$. However, even if such a reaction medium is used, what participates in the sulfating reaction of this invention is considered a concentrated sulfuric acid only. The reason therefor is that the efficiency of a sulfating reaction due to such reaction medium is substantially not different from that due to a concentrated sulfuric acid only.

Influence of the reaction temperature in this invention appears mainly in the depolymerization. Namely, the higher the reaction temperature, the greater the depolymerization. In contrast, proceeding of sulfuric acid esterification does not seem to be effected much by the reaction temperature. The reaction temperature above 50° C. must be avoided since undesirable carbonization and decomposition reaction of dextran and its products are accelerated. When sulfation is carried out especially while inhibiting to a light degree lowering of the molecular weight, use of the reaction temperature of from −30° to −20° C. is preferable. In a reaction at such a low temperature, it is necessary to lower the freezing point of a concentrated sulfuric acid. For this purpose, an aliphatic ether having up to 8 carbon atoms in a proper amount of up to 50% by weight based on the liquid reaction medium is added to concentrated sulfuric acid. As a suitable ether, there are acyclic aliphatic ethers such as diethyl ether, diisopropyl ether, di-n-propyl ether, and ethylene glycol dimethyl ether, and cyclic aliphatic ethers such as tetrahydrofuran and dioxane.

For instance, when dextran (average molecular weight: 28,000, degree of polymerization: 173) is reacted with a concentrated sulfuric acid at a temperature of from 0° C. to −2° C. for 3 hours, the result is that two fractions each having a sulfur content corresponding to the dextran disulfate and an average molecular weight of about 42,000 (degree of polymerization: 115) and 7,870 (degree of polymerization: 21.5), respectively are produced. In contrast, when the same dextran is reacted in a concentrated sulfuric acid containing 15% of tetrahydrofuran at −30° C. for the same period, one fraction having a sulfur content corresponding to the dextran disulfate and an average molecular weight of about 58.00 (degree of polymerization: 158.5) is produced.

Influence of the reaction period in this invention appears in depolymerization and degree of sulfuric acid esterification. Namely in a process wherein dextran is added to a concentrated sulfuric acid and dissolved while uniformly dispersing, it appears the primary sulfuric acid esterification and lowering of the molecular weight occur, thereafter, as time goes by, the secondary sulfuric acid esterification and lowering of the molecular weight occur. For instance, when dextran (average molecular weight: 28,000, degree of polymerization: 173) is reacted with a concentrated sulfuric acid, after 1 hour has elapsed at a reaction temperature of 8–10° C. the reaction products of two fractions each having a sulfur content corresponding to the dextran disulfate and average molecular weight of 59,600 (degree of polymerization: 163) and 10,100 (degree of polymerization: 27.6), respectively are produced, whereas after 3 hours have elapsed a reaction product having a sulfur content corresponding to the dextran trisulfate and an average molecular weight of 61,950 (degree of polymerization: 132) and 10,510 (degree of polymerization: 22.4) are produced. Namely, the reaction period affects both sulfuric acid esterification and lowering of the molecular weight, especially it remarkably affects proceeding of sulfuric acid esterification.

After completion of the reaction, it is very important to efficiently separate the desired product from the reaction mixture. It has been found that when a sufficient amount of an aliphatic ether containing up to 8 carbon atoms is added to the reaction mixture while it is being cooled, the desired product precipitates as a free ester almost quantitatively. As a suitable aliphatic ether, there may be cited what is illustrated above as a freezing point lowering agent for a concentrated sulfuric acid. For instance, by filtration or by centrifugation, said precipitate is separated and when the separated precipitate is washed with the same solvent, an almost pure dextran sulfate is obtained in the form of a free ester, because it is a generally hygroscopic and strongly acidic substance tending to decompose, it is good to make it a salt by neutralizing the same immediately with a proper base (alkali and alkaline earth hydroxides, alkali and alkaline earth carbonates and organic bases).

Another method of separating the desired product from the reaction mixture includes dissolving the reaction mixture in a great excess amount of cold water or an aqueous solution of an alkaline substance such as an alkali metal hydroxide or carbonate, subsequently separating from said aqueous solution an inorganic sulfuric acid ion existing therein by making it, for instance, barium sulfate. When the solution removed of an inorganic sulfuric acid ion is concentrated, followed by addition thereto of a non-solvent for the product such as ethanol, the desired product can be recovered. This recovering method of this product is advantageous for separation of the product from the reaction mixture obtained by a process using as small amount as possible of a concentrated sulfuric acid. Thus, according to one specific feature of this invention, dextran sulfate can be produced by mixing dextran with 300–500 parts by volume based on 100 parts by weight of dextran of a liquid reaction medium wherein at least 50% by weight of a concentrated sulfuric acid having a concentration of at least 85% by weight exists at a temperature within the range of from −30° C. to 50° C. to make the mixture a viscous paste, maintaining the obtained paste at a temperature within said range, dissolving the obtained reaction mixture in an excess amount of water, removing from said aqueous solution an inorganic sulfuric acid ion existing therein and removing the desired product. The reaction medium may be a concentrated sulfuric acid having a concentration of at least 85% by weight so long as it is liquid at a reaction temperature, or a mixture of the concentrated sulfuric acid and up to 50% by weight of the aliphatic ether mentioned above.

The sulfur content in a sodium salt of dextran sulfate obtained by the process of this invention is very close to a value corresponding to the monosulfate (12.1%), disulfate (17.5%) or trisulfate (20.5%). From this fact it is considered that the sulfur content of the product depends upon the reaction conditions, and under certain conditions mainly the monosulfate, under other conditions mainly the disulfate and under still other conditions mainly the trisulfate is produced, respectively. This fact further means that the products obtained by the process of this invention have sulfate groups distributed in inner molecular homogeneity.

Another feature of the product obtained by the process of this invention is uniform distribution of sulfate groups moleculars and homogeneity of molecular weight distribution. When sodium dextran sulfate obtained by the process of this invention is dialyzed, in some case a low molecular weight fraction coming out of the dialyzing film is obtained and in another case a low molecular weight fraction passing the dialyzing film and a high molecular weight fraction not passing the dialyzing film are obtained. Each of these fractions acts as distinct one component on paper electrophoresis, from which it is understood that each fraction has relatively uniform distribution of molecular weight and sulfate group distribution among molecules. These homogeneities can be confirmed by ion exchange chromatography and Sephadex column chromatography.

It has been unexpectedly found that the product obtained by the process of this invention has superior blood anti-coagulant activity in vitro and in vivo and a lower toxicity as compared with the product having substantially the same sulfur content and average molecular weight obtained by the conventional process (a sulfating process by pyridine-ClSO$_3$H).

Next, this invention will be explained in detail with reference to examples. However, it should be understood that this invention will not be limited by these examples.

EXAMPLE 1

100 ml. of a commercially available reagent, first-class concentrated sulfuric acid (concentration being at least 95%) were cooled to a temperature of 0° C., to which 10 g. of dextran (average molecular weight: 28,000, degree of polymerization: 173) were added and dissolved and the mixture was reacted at a temperature of 8° to 10° C. for 1 hour with stirring. Next, while the reaction mixture was maintained at a temperature below 0° C., 800 ml. of ethyl ether were added thereto to precipitate the reaction product. When the precipitate was filtered by a glass filter and washed with ethyl ether, free dextran sulfate was obtained as white hygroscopic power was dissolved in cold water and pH was made 6.5 by a caustic soda solution, thereafter, using a dialyzing film (commercially available Visking tube 36/32) the solution was dialyzed in distilled water (3 times, 1,000 ml. per time, distilled water replaced every 24 hours).

When a liquid inside the dialyzing film was concentrated under a reduced pressure and filtered, the resultant liquid (about 100 ml.) was added with 800 ml. of ethanol to separate precipitate, thereafter the precipitate was filtered and washed with ethanol and ethyl ether, successively, sodium dextran sulfate was obtained in the state of white powder, which powder was dried at 85° C. under a reduced pressure for 2 hours.

| | |
|---|---|
| Yield _____g__ | 8.25 |
| Sulfur content _____percent__ | 16.92 |
| Average molecular weight (due to end group analysis) _____ | 59,650 |
| Degree of polymerization (calculated from molecular weight) _____ | 163.0 |

A liquid outside the dialyzing film (about 3 l.) was added with a barium acetate solution to precipitate an inoragnic sulfuric acid ion as barium sulfate and the precipitate was centrifuged, thereafter the supernatant liquid was concentrated under a reduced pressure to make the amount about 100 ml. After separating a small amount of impurities by filtration or centrifugation of the concentrated liquid, said liquid was added with 800 ml. of ethanol to separate precipitate. When the precipitate was filtered and washed with ethanol, ethyl ether, successively, sodium dextran sulfate was obtained as white powder, which was dried at 85° C. under a reduced pressure for 2 hours.

Yield _____ g__ 10.9
Sulfur content _____ percent__ 17.90
Average molecular weight (due to end group analysis) _____ 10,100
Degree of polymerization (calculated from molecular weight) _____ 27.6

EXAMPLE 2

100 ml. of a commercially available reagent, first-class concentrated sulfuric acid (concentration being at least 95%) were cooled to a temperature of 0° C., to which 10 g. of dextran (average molecular weight: 28,000, degree of polymerization: 173) were added and dissolved, and the mixture was reacted at a temperature of 8°–10° C. for 3 hours with stirring. Next, while the reaction mixture was maintained at a temperature below 0° C., 800 ml. of ethyl ether were added thereto to precipitate the reaction product. When the precipitate was filtered and washed with ethyl ether, free dextran sulfate was obtained as white hygroscopic powder. Said powder was dissolved in cold water, pH was made 6.5 by a caustic soda solution, thereafter using a dialyzing film (commercially available Visking tube 36/32), the aqueous solution was dialyzed in distilled water (3 times, 1,000 ml. per time, distilled water replaced every 24 hours).

When a liquid inside the dialyzing film was concentrated under a reduced pressure and filtered, the resultant liquid (about 100 ml.) was added with 800 ml. of ethanol to form a precipitate, thereafter the precipitate was filtered and washed with ethanol, ethyl ether, successively, sodium dextran sulfate was obtained as white powder, which powder was dried at 85° C. under a reduced pressure for 2 hours.

Yield _____ g__ 3.2
Sulfur content _____ percent__ 21.68
Average molecular weight (due to end group analysis) _____ 61,950
Degree of polymerization (calculated from molecular weight) _____ 132

A liquid outside the dialyzing film (3 l.) was added with a barium acetate solution to precipitate an inorganic sulfuric acid ion as barium sulfate and said sulfate was centrifuged, thereafter the supernatant liquid was concentrated under a reduced pressure to make the amount about 100 ml. After removing a small amount of impurities by filtration or centrifugation of the concentrated liquid, when said liquid was added with 800 ml. of ethanol to separate precipitate, the precipitate was filtered and washed with ethanol, ethyl ether, successively, sodium dextran sulfate was obtained as white powder, which powder was dried at 85° C. under a reduced pressure for 2 hours.

Yield _____ g__ 9.45
Sulfur content _____ percent__ 21.93
Average molecular weight (due to end group analysis) _____ 10,510
Degree of polymerization (calculated from molecular weight) _____ 22.4

EXAMPLE 3

50 ml. of a commercially available reagent, first-class concentrated sulfuric acid (concentration being at least 95%) was added with 18.5 ml. of tetrahydrofuran, thereafter the mixture was cooled by dry ice-acetone and the internal temperature was maintained at −30° C., to which mixture 5 g. of dextran (average molecular weight: 28,000, degree of polymerization: 173) were added, and the mixture was reacted at said temperature for 3 hours with stirring. While the reaction mixture was maintained at −30° C., it was added with 400 ml. of ethyl ether to precipitate the reaction product. When the precipitate was filtered by a glass filter and washed with ethyl ether, free dextran sulfate was obtained as white hygroscopic powder. Said powder was dissolved in cold water and pH was made 6.5 by a caustic soda solution, thereafter using a dialyzing film (commercially available Visking tube 36/22), the aqueous solution was dialyzed in distilled water (500 ml.). In a liquid outside the dialyzing film, there was no dextran sulfate.

A liquid inside the dialyzing film was concentrated under a reduced pressure and filtered, the filtered liquid (about 50 ml.) were added to 400 ml. of ethanol to separate precipitate, thereafter when the precipitate was washed with ethanol, ethyl ether, successively, sodium dextran sulfate was obtained as white powder, which powder was dried at 85° C. under a reduced pressure for 2 hours.

Yield _____ g__ 9.2
Sulfur content _____ percent__ 16.98
Average molecular weight (due to end group analysis) _____ 58,000
Degree of polymerization (calculated from molecular weight) _____ 158.5

EXAMPLE 4

15 ml. (28 g.) of a commercially available reagent, first-class concentrated sulfuric acid was cooled to a temperature below 0° C., and when 5 g. of dextran (average molecular weight: 28,000, degree of polymerization: 173) were added thereto and uniformly mixed, an opaque viscous paste was obtained, which when maintained at a temperature of from 0° to −3° C. for 30 minutes became transparent. Said transparent paste was maintained at the same temperature for 1 hour, thereafter dissolved in a cooled 5% NaOH aqueous solution to make said paste an aqueous solution having pH of about 6.5.

Next, by the dialyzing operations mentioned in Example 1 sodium dextran sulfate having an average molecular weight of 32,220 (yield: 6.1 g., sulfur content: 17.27%) and sodium dextran sulfate having an average molecular weight of 6,940 (Yield: 3.5 g., sulfur content: 18.02%) were obtained.

What is claimed is:

1. The process of manufacturing dextran sulfate which comprises dissolving dextran in a liquid reaction medium consisting of a concentrated sulfuric acid having a concentration of at least 85% by weight at a temperature within the range of from −30° to +50° C. whereby simultaneous sulfation and depolymerization occurs, maintaining the obtained solution at a temperature within said range, and recovering from the reaction mixture the desired product in the form of a free ester or a salt thereof.

2. The method according to claim 1 wherein said reaction medium contains up to 50% by weight of an aliphatic ether having up to 8 carbon atoms.

3. The process of manufacturing dextran sulfate which comprises dissolving dextran in a liquid reaction medium consisting of a concentrated sulfuric acid having a concentration of at least 85% by weight at a temperature within the range of from −30° to +50° C. whereby simultaneous sulfation and depolymerization occurs, maintaining the obtained solution at a temperature within said range, adding to the reaction mixture a sufficient amount of an aliphatic ether containing up to 8 carbon atoms whereby producing precipitate of dextran sulfate, and recovering the desired product.

4. The method according to claim 3 wherein said reaction medium contains up to 50% by weight of an aliphatic ether having up to 8 carbon atoms.

5. The process of manufacturing dextran sulfate which comprises mixing dextran with 300–500 parts by volume per 100 parts by weight of dextran of a liquid reaction medium containing a concentrated sulfuric acid having a concentration of at least 85% by weight at a temperature within the range of from −30° to +50° C. whereby simultaneous sulfation and depolymerization occurs to form a viscous paste, maintaining the obtained paste at a temperature within said range, dissolving the obtained reaction mixture in an excess amount of water, removing from the aqueous solution an inorganic sulfuric acid ion existing therein thereby recovering the desired product.

6. The method according to claim 5 wherein said reaction medium contains up to 50% by weight of an aliphatic ether having up to 8 carbon atoms.

References Cited

UNITED STATES PATENTS 3,141,014  7/1964  Morii et al.
2,612,498  9/1952  Alburn _____ 260—209
2,638,470  5/1953  Alburn _____ 260—234

LEWIS GOTTS, Primary Examiner
JOHNNIE R. BROWN, Assistant Examiner

U.S. Cl. X.R.
260—999